United States Patent
Lin et al.

(10) Patent No.: US 6,808,783 B1
(45) Date of Patent: Oct. 26, 2004

(54) STORAGE MEDIA WITH NON-UNIFORM PROPERTIES

(75) Inventors: Gang Herbert Lin, San Jose, CA (US); Thao Nguyen, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 10/052,621

(22) Filed: Jan. 17, 2002

(51) Int. Cl.$^7$ .............................. G11B 5/66; G11B 5/68
(52) U.S. Cl. ................. 428/65.3; 428/65.7; 428/156; 428/212; 428/215; 428/336; 428/409; 428/694 T; 428/694 TS; 428/694 TM; 428/694 B; 428/694 BS; 428/694 BM
(58) Field of Search .............................. 428/65.5, 336, 428/611, 65.3, 65.7, 156, 212, 215, 332, 409, 694 T, 694 TS, 694 TM, 694 B, 694 BS, 694 BM

(56) References Cited

U.S. PATENT DOCUMENTS

| | | | | |
|---|---|---|---|---|
| 4,522,848 A | * | 6/1985 | Patel | 427/131 |
| 4,610,911 A | | 9/1986 | Opfer et al. | 428/213 |
| 4,663,009 A | * | 5/1987 | Bloomquist et al. | 204/192.2 |
| 4,929,514 A | | 5/1990 | Natarajan et al. | 428/611 |
| 5,149,409 A | | 9/1992 | Ahlert et al. | 204/192.2 |
| 5,324,593 A | | 6/1994 | Lal et al. | 428/610 |
| 5,393,584 A | * | 2/1995 | Satoh et al. | 428/65.3 |
| 5,432,012 A | | 7/1995 | Lal et al. | 428/610 |
| 5,520,981 A | | 5/1996 | Yang et al. | 428/65.5 |
| 5,707,706 A | | 1/1998 | Fukaya et al. | 428/65.3 |
| 5,723,032 A | | 3/1998 | Yamaguchi et al. | 204/192.2 |
| 5,763,071 A | | 6/1998 | Chen et al. | 428/332 |
| 5,840,394 A | * | 11/1998 | Ranjan et al. | 428/65.3 |
| 5,900,324 A | * | 5/1999 | Moroishi et al. | 428/611 |
| 6,156,422 A | * | 12/2000 | Wu et al. | 428/332 |
| 6,210,819 B1 | * | 4/2001 | Lal et al. | 428/694 T |
| 2002/0114978 A1 | * | 8/2002 | Chang et al. | 428/694 TM |

FOREIGN PATENT DOCUMENTS

| | | | | |
|---|---|---|---|---|
| JP | 58-062829 A | * | 4/1983 |
| JP | 60-101720 A | * | 6/1985 |
| JP | 05-189738 A | * | 7/1993 |
| JP | 06-215344 A | * | 8/1994 |

OTHER PUBLICATIONS

JPO Abstract Translation of JP 05–189738–A (Doc. ID: JP 05189738 A).*
JPO Abstract Translation of JP 06–215344–A (Doc. ID: JP 06215344 A).*
Machine Translation of JP 06–215344–A.*
JPO Abstract Translation of JP 60–101720–A (Doc. ID: JP 60101720 A).*
Derwent Abstract Translation of JP 58–062829–A (Derwent Acc. No. 1983–50001K).*
Englsih Translation of JP 06–215344 A (PTO 03–4033).*
English Translation of JP 05–189738 A (PTO 03–4034).*

\* cited by examiner

*Primary Examiner*—Kevin M. Bernatz
(74) *Attorney, Agent, or Firm*—Sheridan Ross P.C.

(57) ABSTRACT

The present invention is directed to a writable or recordable disk that has radially varying recording properties. In one configuration, the magnetic moment, magnetic remanence, and/or information layer thickness decreases from the disk inner diameter to the disk outer diameter. In one configuration, the writing property or coercivity of the disk decreases from the disk inner diameter to the disk outer diameter. The variation in writing property may be accomplished by varying the thickness of an underlayer to the information layer.

76 Claims, 4 Drawing Sheets

STORAGE MEDIA WITH NON-UNIFORM PROPERTIES

FIELD OF THE INVENTION

The present invention relates generally to information storage media and specifically to magnetic recording media, such as thin-film magnetic disks.

BACKGROUND OF THE INVENTION

Magnetic hard-disk drives can store and retrieve large amounts of information. The information is commonly stored as a series of bits on a stack of thin-film magnetic disk platters, each of which is an aluminum alloy or glass substrate coated on each side with a thin-film magnetic material and one or more protective layers. A bit is identified as a flux transition, and bit density is measured as the number of flux transitions per unit length. Typically, the higher the bit density, the lower the signal-to-noise ratio. Read-write heads, typically located on both sides of each platter, record and retrieve bits from circumferential tracks on the magnetic disks.

Although great strides have been made over the past decade in increasing the bit density of hard drives, information storage requirements have increased dramatically. An ongoing challenge of disk drive manufacturers is to provide even higher areal (bit) densities for thin-film magnetic disks.

The annular disk shape has complicated the ability to obtain further significant increases in bit density because of the existence of differing operating conditions in different parts of the disk. Due to the annular shape of disks, the lengths of the inner tracks (in the inner diameter ("ID") disk region) are significantly less than the lengths of the outer tracks (in the outer diameter ("OD") disk region), and therefore the track velocity in the ID region is less than the track velocity in the OD region.

The disparate track velocities in the ID and OD disk regions together with the substantial uniformity in disk properties across the face of the disk cause the User Bit Density or UBD in the ID and OD regions to be subject to different limiting factors. In the ID and OD regions, permissible bit densities are typically limited by one or more of the percolation limit (which is a measure of how close together magnetic field transitions in adjacent bits can be positioned before the adjacent magnetic fields are subject to mutual interference or cancellation), the signal strength (or signal-to-noise ratio or SNR), pulse width, the performance characteristics of the data detection channel, and/or the grain size of the recording medium. Presently in the ID region, the UBD is limited by data detection channel performance. Beyond a certain UBD value, the Bit Error Rate (BER) of the channel is unacceptable. In the OD region by contrast, the bit density is limited not by data detection channel performance such as UBD but by noise and signal strength (or by the minimum acceptable SNR). The data rate in the OD region is generally much higher than in the ID region due to the higher track velocities in the OD region. Higher data rates introduce more system noise during recording and therefore provide a lower SNR (compared to the same signal strength in the ID region) when information is later accessed by the head. To maintain noise at acceptable levels, the UBD in the OD region is typically reduced; that is, the performance degradation from high data rates in the OD region is offset by the low UBD in the same region. Thus, unused channel capacity exists in the OD region.

There is thus a need for providing a thin-film magnetic disk having a high areal (bit) density, such as by utilizing a larger percentage of the unused channel capacity in the OD region.

SUMMARY OF THE INVENTION

The present invention is directed to a storage media with at least substantially nonuniform properties to enhance performance of the media and/or provide a high areal bit density of the media. By using nonuniform properties, for example, the ID and OD regions can be configured differently to provide optimum or near optimum disk properties for the differing operating conditions of the two regions.

In one embodiment of the present invention, a disk for information storage is provided that includes:

(a) a substrate and
(b) an information layer.

An underlayer can be located between the substrate and the information layer to provide a consistent surface structure for deposition of the information layer and/or to control the properties such as coercivity of the information layer. The disk has one or more (or all) of the following properties: (i) two or more recording parameters that vary radially, (ii) a writing property (e.g., the coercivity of magnetic materials) that varies radially, (iii) an underlayer having a thickness that varies radially which, in one configuration, causes a recording parameter (e.g., the coercivity) of the disk to vary radially, and (iv) the information layer has a thickness that increases from an inner disk diameter to an outer disk diameter. As will be appreciated, the "coercivity" of a magnetic material refers to the value of the magnetic field required to reduce the remanence magnetic flux to zero, i.e., the field required to erase a stored bit of information. A higher coercivity allows adjacent recorded bits to be placed more closely together without mutual interference or cancellation.

Many disk variations are possible according to the concepts of the present invention. For example in one configuration, the two or more magnetic parameters of condition (i) include a magnetization-thickness product (Mrt) and a coercivity. The Mrt or magnetization thickness product (or magnetization product or magnetic moment) is the product of the remnant or remanence magnetization Mr and the thickness of the magnetic material. The remanence moment or magnetic moment is a measure of the signal amplitude that can be read from pulses stored in the medium—the greater the remanence moment, the greater the signal amplitude that can be detected in a reading operation. In order to cause the MRT to vary radially, the thickness of the information layer is varied radially, such as by increasing the thickness of the Mrt from the inner disk diameter to the outer disk diameter and/or by otherwise increasing the magnetic remanence from the inner disk diameter to the outer disk diameter, such as by a altering radially the chemical composition of the information layer.

In a preferred configuration, the magnetic remanence and/or the magnetic moment (Mrt) of the disk increases from the inner disk diameter to the outer disk diameter, and the coercivity decreases from the inner disk diameter to the outer disk diameter. These trends reflect the unique operating conditions in each of the two regions. That is, the higher coercivity and lower magnetic moment in the ID region support a higher linear density due to reduced UBD, and the lower coercivity and higher magnetic moment in the OD region improves writing properties and signal-to-noise ratio. In one configuration, the underlayer has a thickness that decreases from an inner diameter of the disk to an outer diameter of the disk to decrease the coercivity from the inner to outer disk diameters. In one configuration, the increased Mrt or magnetic remanence in the OD region provides a higher signal strength (or SNR), thereby permitting more noise to be tolerated and a higher linear bit density (or UBD) to be utilized. The decrease in the coercivity towards the OD region further provides better writing properties in the OD region (in which recording heads typically encounter more resistance to recording or writing bits), thereby providing reduced demands (relative to existing storage media) on the write head, the data detection channel, and the pre-amplifier, and permitting the head to write to the disk at a higher data rate. As a result of the foregoing, the Bit Per Inch (BPI) can be high enough in the OD region to be limited by data detection channel performance, as in the case of the ID region. The use, in the OD region, of a higher BPI than has been previously possible provides a significant increase in the areal density of the disk. For example, in a conventional disk the BPI reduction from the ID to the OD regions typically varies between about 20% to about 50%. Using the disk design of the present invention, the BPI reduction can be much lower than these values.

In this configuration, the disk typically includes a plurality of radial (concentrically disposed) zones, each of which has substantially uniform recording properties (e.g., coercivity, magnetic remanence, magnetic moment, etc.) throughout the zone's areal (or radial) extent. In other words, a first radial zone located between a first pair of radii (measured from a disk center) has first recording properties at least substantially throughout the first zone, and a second radial zone located between a second pair of radii (measured from the disk center) has second recording properties at least substantially throughout the second zone. The first and second zones are thus disposed concentrically relative to one another. One or more of the first pair of radii are different (e.g., smaller) than the second pair of radii, and one or more of the first recording properties, are different from the second recording properties. Commonly, a plurality of such concentric zones or bands are located on each surface of the disk. In one configuration, the recording properties vary radially in a stepwise fashion. In another configuration, the recording properties vary radially in a linear or at least substantially linear fashion or a curvilinear or at least substantially curvilinear fashion (in which cases the radial zones are commonly thinner in width than in the case of stepwise variation).

In another embodiment, a method for manufacturing a disk for information storage is provided. The method includes the steps of:
(a) depositing an underlayer on to a substrate; and
(b) depositing an information layer. The substrate and information layer are located on opposing sides of the underlayer. The disk has one or more of the properties referred to above.

The underlayer and information layer are typically deposited by the same technique. Preferably, the two layers are deposited by sputtering techniques.

In yet another embodiment, a method for recording information on a disk is provided that includes the steps of:
(a) positioning a recording head at a first position, at which the disk at the first position has a first writing property (e.g., coercivity); and
(b) positioning the recording head at a second position, at which the disk at the second position has a second writing property (e.g., coercivity). The first position and second position are at differing distances from a center of the disk, and the first and second writing properties have differing magnitudes (e.g., the recording head can write more readily or at a higher SNR in the second position compared to the first position). In one configuration, the first position is closer to the disk center than the second position.

In yet another embodiment a disk drive is provided that includes:
(a) a disk having a first side, a second side that is at least substantially parallel to the first side, a plurality of concentric tracks located on the first side, an underlayer, and an information layer;
(b) a spin motor for rotating the disk;
(c) a recording head for recording data at a track location; and
(d) an actuator for moving the recording head relative to the disk, wherein the disk has at least one of the properties referred to above.

The spin motor, recording head, and actuator can be of any suitable design. For example, the recording/reading head can be a magnetoresistive, head, a giant magnetoresistive head, an inductive head, a perpendicular recording head, TMR heads, a CMR head, an optical head, and the like, with a magnetoresistive and giant magnetoresistive head being preferred. The head design can be a flying or proximity head design, a contact head design, or pseudo-contact head design.

The foregoing summary is neither an exhaustive nor complete description of the invention. As will be appreciated, other embodiments and configurations are obvious based on one or more of the features noted above. Such embodiments and configurations are deemed to be a part of the present invention.

DETAILED DESCRIPTION

Figure 1:
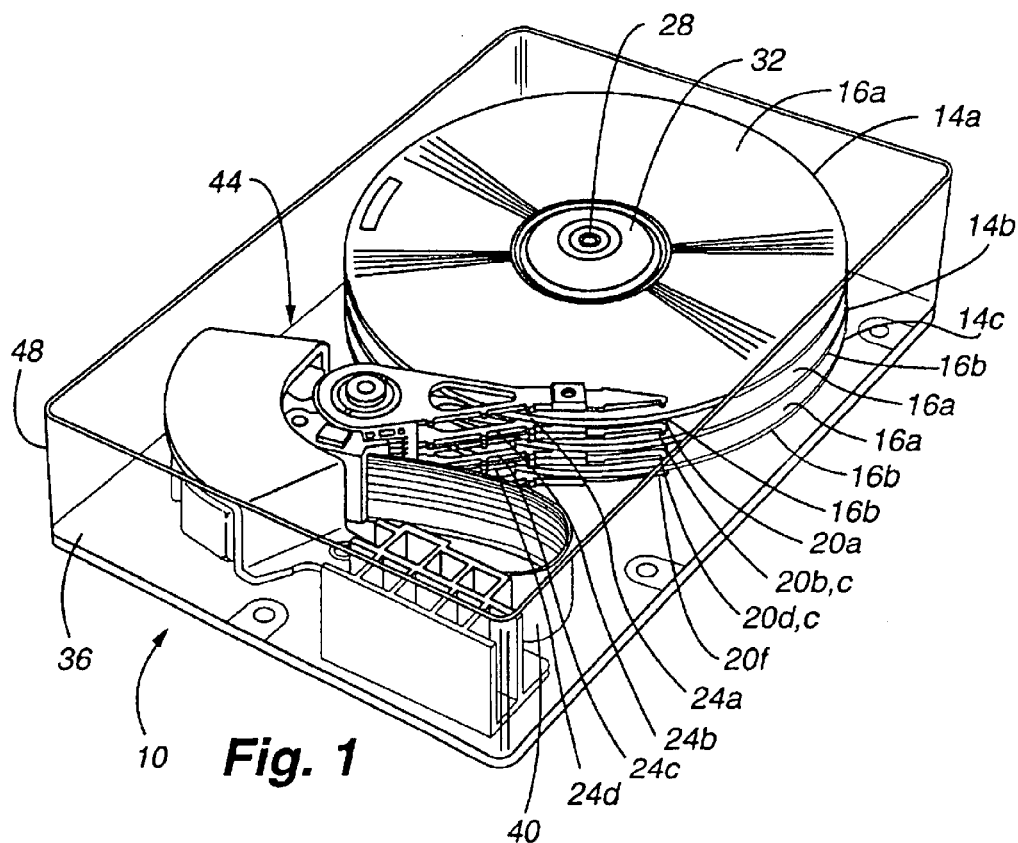
FIG. 1 is a diagrammatic representation of a perspective view of a disk drive according to the present invention.

A disk, according to the present invention, typically includes a substrate supporting one or more information layers and one or more underlayers. An underlayer typically corresponds to each information layer and is located between the respective information layer and the substrate.

The information layer can be composed of any suitable material(s) for recording and/or storing information. For example, the information layer can be composed of a bulk, thick-film or thin-film material that stores information optically, magnetically, or magneto-optically. As will be appreciated, optical media use a variety of mechanisms to store information, such as a phase change, a dye or color change, ablation, magnetoptics, and halographics. Preferably, the information layer includes one or more thin film magnetic layers that employ iron, nickel, or cobalt or alloys of iron, nickel, or cobalt with one or more of samarium, chromium, tantalum, platinum, boron, and silver. The information layer typically has a thickness ranging from about 50 to about 5,000 Å. In one configuration, the information layer includes a first magnetic layer, a second magnetic layer, and an at least substantially non-magnetic layer located between the first and second magnetic layers to provide a relatively low degree of noise.

The substrate can be any material suitable for the information layer. For example, the substrate can be an aluminum plate, NiP-plated aluminum alloy plate, a ceramic plate, a glass-based plate, a glass-ceramic plate, a carbon plate (e.g., electrically conductive graphite which can provide higher coercivities), a titanium substrate, and plastic substrates.

The underlayer can be any material suitable for deposition of the information layer. Preferably, the underlayer is at least substantially nonmagnetic and is formed from chromium, a chromium alloy such as chromium-vanadium, or chromium-titanium, oxygen doped chromium, tungsten, or a tungsten alloy, aluminum-based alloys or nickel-phosphorous and alloys thereof. The preferred underlayer thickness ranges from about 50 to about 5,000 Å.

The disk can include additional layers, depending on the application. For example, the disk can include one or more protective layers positioned over the information layer to inhibit corrosion of any underlying material and/or to provide an acceptable surface for landing of the read and/or write head. A preferred protective layer includes carbon or cobalt oxide. The protective layer typically has a thickness ranging from about 250 to about 1,000 Å. The disk can include one or more barrier layers located between the information layer and the protective layer to inhibit atomic migration to or from the underlying layers. Preferred barrier layers include chromium, a chromium alloy such as chromium-vanadium, or chromium-titanium, oxygen doped chromium, tungsten, or a tungsten alloy, ruthenium or oxidation layers. A barrier layer typically has a thickness ranging from about 100 to about 1,000 Å. The disk can include a lubricant layer located adjacent to the protective layer and separated from the information layer by the protective layer. A preferred lubricant layer includes a perfluoropolymer. The lubricant layer typically has a thickness ranging from about 5 to about 100 Å. Finally, the disk can include a nickel-phosphorus layer that is located between the substrate and the underlayer. The nickel-phosphorus layer preferably has an ablated or at least substantially smooth top surface and a thickness ranging from about 0.0001 to about 0.001 inches.

Figure 2:
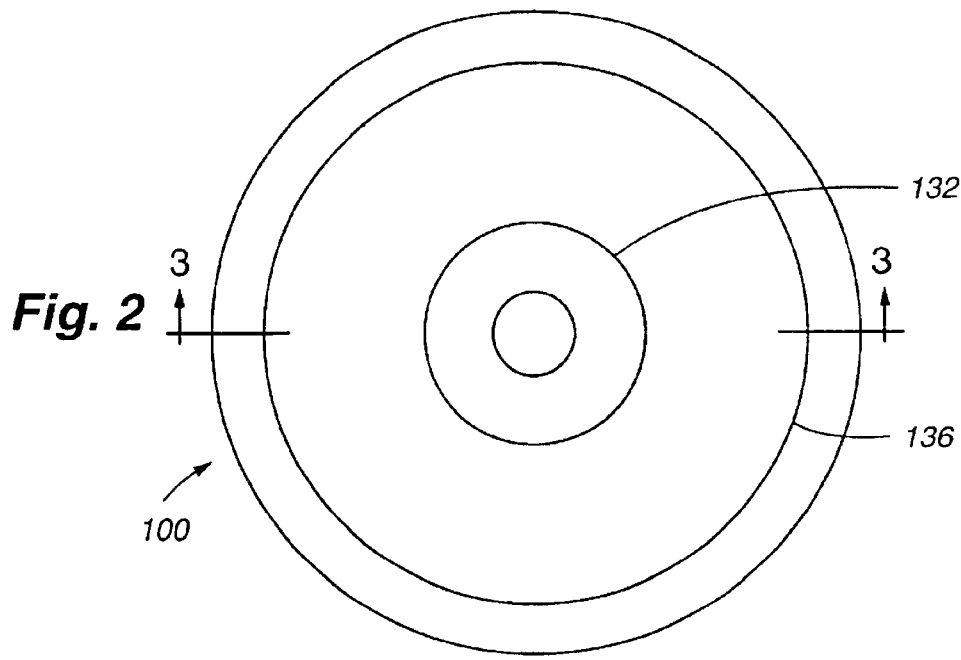
FIG. 2 is a diagrammatic representation of a plan view of a disk according to an embodiment of the present invention.
Figure 3:
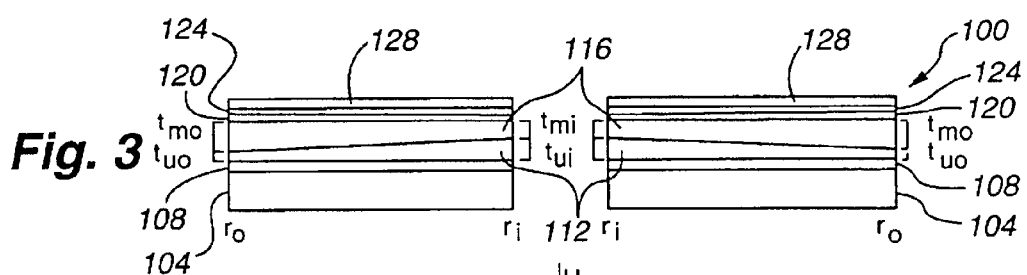
FIG. 3 is a cross-sectional view taken along line 3—3 of FIG. 2.

A single-sided thin-film magnetic disk configuration incorporating the above features is depicted in more detail in FIGS. 2 and 3. Although a single-sided disk is depicted in the figures discussed below, the concepts of the present invention are equally applicable to dual-sided disks. The single-sided disk 100 includes a substrate 104, a nickel-phosphorous layer 108 providing a smooth surface for later deposited layers, an underlayer 112 acting as a barrier layer against contamination of other layers by the substrate 104 and providing improved magnetic properties, a magnetic layer 116 for recording information, a barrier layer 120 preventing contamination of the magnetic layer 116 by contaminants on the disk surface, a protective layer 124, and a lubricant layer 128. The chemical compositions of the various layers are at least substantially constant throughout the layers. The nickel-phosphorous or smoothing layer 108 preferably includes from about 85 to about 95 atomic % nickel and from about 5 to about 15 atomic % phosphorous. The underlayer 112 is preferably chromium with a low amount of impurities. The magnetic layer 116 preferably includes from about 60 to about 80 atomic % cobalt, from about 0.5 to about 5 atomic % chromium, from about 0.5 to about 5 atomic % tantalum, from about 1 to about 10 atomic % platinum, and from about 0.5 to about 5 atomic % boron. The barrier layer 120 is preferably chromium with a low amount of impurities. The protective layer 124 is preferably carbon. The lubricant layer 128 is preferably a perfluoropolymner such as Am2001 manufactured by Montedison Company.

Although the thicknesses of the substrate, nickel-phosphorous layer, barrier layer, protective layer, and lubricant layer are at least substantially radially constant, the thicknesses of the magnetic layer and underlayer radially vary (in a reverse relationship to one another) to provide desired magnetic properties for the disk. As shown in FIG. 3, the inner magnetic layer thickness $t_{mi}$ (at radial distance $r_i$) is less than the outer magnetic layer thickness $t_{mo}$, (at outer radial distance $r_o$), and the inner underlayer thickness $t_{ui}$ (at radial. distance $r_i$) is more than the outer underlayer thickness $t_{uo}$ (at outer radial distance $r_o$). As noted, the variation in magnetic layer thickness provides a lower Mrt at the inner radius and a higher Mrt at the outer radius while the variation in underlayer thickness provides a higher coercivity at the inner radius and a lower coercivity at the outer radius. The permissible degree of variation is generally determined based on the following equation:

$$PW \propto \sqrt{Mrt/H_c}$$

where PW is the pulse width, Mr is the magnetic remanence, t is the thickness of the magnetic layer 116, and $H_c$ is the coercivity of the magnetic layer 116. The bit length at the outer diameter region of the disk 100 is longer than the bit length of the inner diameter region due to the higher velocity of the outer diameter region compared to the inner diameter region. To provide a UBD in the outer diameter region that is close to the UBD in the inner diameter region, the above relation permits the Mrt product to be increased (relative to the inner diameter region) and $H_c$ to be decreased (relative to the inner diameter region) to yield the longer permissible pulse width in the outer diameter region. The higher Mrt provides a higher SNR in the outer diameter region, and the lower $H_c$ provides better writing properties in the outer diameter region.

Figure 16:
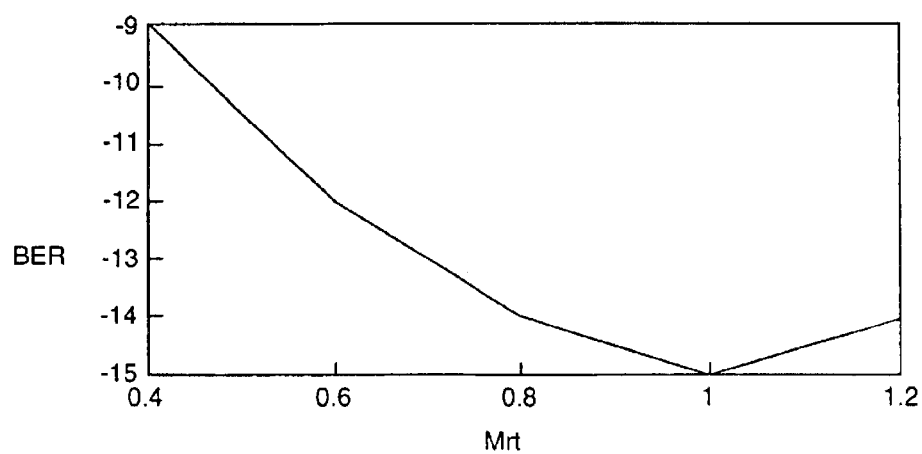
FIG. 16 is a plot of bit error rate plotted on a logarithmic scale (vertical axis) and magnetization product (horizontal axis).

FIG. 16, which is a plot of BER (vertical) against Mrt (horizontal), depicts the improved performance for higher Mrt values. At 1.0 Mrt, the performance is optimum, though the degree of head saturation can affect the curve. At a high Mrt, the performance degrades due to high UBD and higher noise from disks. However, the use (in the outer diameter region) of an Mrt of 1 instead of 0.6, which is the typical Mrt for the inner diameter region, leads to improved performance. Alternatively, an Mrt of 1 permits the BPI (Bit Per Inch) reduction in the outer diameter to be reduced to only 14% to achieve the same performance as the inner diameter region. This can effectively increase the BPI at the outer diameter and hence the outer diameter capacity. In other design conditions, the improvement can of course be much larger than that illustrated in FIG. 16.

Figure 4:
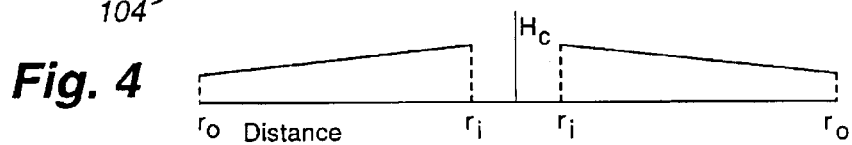
FIG. 4 is a plot of $H_c$ versus radial distance for the disk of FIG. 2.
Figure 5:
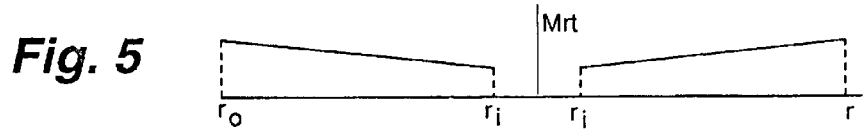
FIG. 5 is a plot of Mrt versus radial distance for the disk of FIG. 2.
Figure 6:
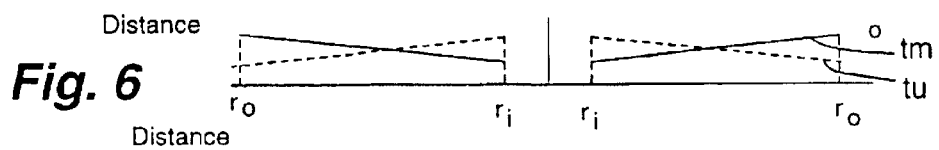
FIG. 6 is a plot of t versus radial distance for the disk of FIG. 2.
Figure 7:
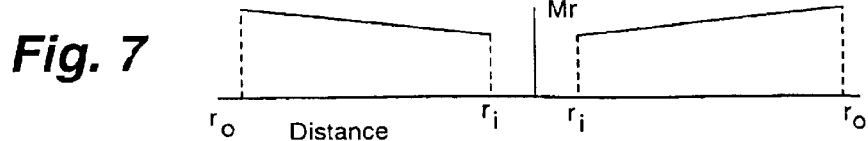
FIG. 7 is a plot of Mr versus radial distance for the disk of FIG. 2.

The variation in magnetic layer and underlayer thicknesses is depicted in FIGS. 3–7 as being at least substantially linear. For higher spin velocities, the slope of the line in FIGS. 3–7 would be steeper and for lower spin velocities the slope would be shallower. Referring to FIG. 4, the coercivity is shown as decreasing from $r_i$ to $r_o$. Referring to FIG. 5, the Mrt is shown as increasing from $r_i$ to $r_o$. Referring to FIG. 6, the magnetic layer thickness $t_m$ is shown as increasing from $r_i$ to $r_o$, and the underlayer thickness $t_u$ as decreasing from $r_i$ to $r_o$. Finally, FIG. 7 shows the magnetic remanence as increasing from $r_i$ to $r_o$. Although a linear relationship is depicted in FIGS. 3–7, other relationships can be employed, such as curvilinear, rectilinear, etc., relationships depending on the application.

FIG. 2 shows that the disk has a plurality of concentrically disposed radial zones, of which first and second zones 132 and 136 are depicted. The first and second radial zones 132 and 136 each have an at least substantially constant Mr, t, $H_c$, and underlayer thickness throughout the areal extent of the radial zone. These variables, however, are each different for the two zones.

Typically, the first writing property such as coercivity at the first position ranges from about 2,000 to about 6,000 Oersteds (measured at low frequencies, e.g., 100 Hz) and the disk at the first position has a squareness S* ranging from about 0.6 to about 1.0. Typically, the second writing property at the second position ranges from about 2,000 to about 6,000 Oersteds (measured at low frequencies, e.g., 100 Hz) and the disk at the second position has a squareness S* ranging from about 0.6 to about 1.0.

The disk at the first position preferably has a first magnetic remanence and at the second position a second magnetic remanence, with the first magnetic remanence being less than the second magnetic remanence. The first magnetic remanence typically ranges from about 100 to about 600 emu/cm³, and the second magnetic remanence from about 100 to about 600 emu/cm³. The first magnetic remanence is typically no more than about 95% of the second magnetic remanence.

Because of the variation in magnetic remanence, the disk at the first position typically has a first magnetic moment and at the second position a second magnetic moment with the first magnetic moment being less than the second magnetic moment. In one configuration, the first magnetic moment ranges from about 0.2 to about 1.0 memu/cm², and the second magnetic moment from about 0.2 to about 1.0 memu/cm². In one configuration, the first magnetic moment is no more than about 95% of the second magnetic moment. In one configuration, a first thickness of the magnetic layer is more than a second thickness of the magnetic layer. The first thickness is typically at least about 75% of the second thickness. The first thickness commonly ranges from about 60 to about 300 Å and the second thickness from about 60 to about 300 Å.

As a result of the variable properties of the disk at the first and second locations, the two locations can have differing areal densities. In one configuration, a first areal density (or first user bit density) at the first location ranges from about 20 to about 200 Gb/cm² and a second areal density at the second location from about 20 to about 200 Gb/cm². In one configuration, the first areal density at the first location is at least about 105% and typically ranges from about 100 to about 140% of the second areal density at the second location. The total storage capacity for the disk is preferably at least about 10 GbB/surface for a 3½ inch diameter disk.

A disk drive that may be used with the disk of FIGS. 2–3 is depicted in FIG. 1. The disk drive 10 includes a plurality of platters or disks 14a–c with each disk 14a–c typically having upper and lower information storage surfaces 16a,b, a plurality read-write heads 20a–f attached to the ends of radially moving arms 24a–d, a spin motor (located beneath the disks) that rotates the disks via a spindle 28 that engages the disk hubs 32, a printed circuit board or PCB 36, flex circuit 40, head actuator 44, and protective housing 48 (shown as a transparent housing (with top removed) in FIG. 1. The information storage surfaces 16a,b store information as a series of bits or magnetically encoded areas. The heads 20a–f move radially across both the top and bottom surfaces of the spinning disks. The heads write information to the disks by aligning the magnetic fields of particles on the disk surfaces and read information by detecting the polarities of particles that have already been aligned. The circuit board 36 includes the drive's controller (not shown). The controller is managed by the operating system and the basic input-output system, which is low level software that links the operating system to the hardware. The controller provides commands to the activator, which force the head actuator 44 to move the heads 20a–f across the storage surfaces 16a,b of the platters 14a–c. The actuator 44 precisely aligns the heads 20a–f with the concentric circles of tracks on the storage surface 16a,b of the platters 14a–c. The controller also controls the spindle 28 that turns the platters at a constant speed and instructs the heads 20a–f when to read from and when to write to the disk storage surface(s).

Figure 8:
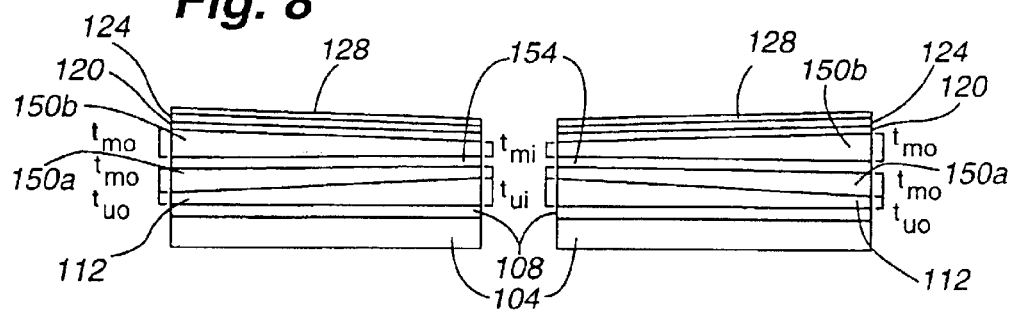
FIG. 8 is a diagrammatic representation of a cross-sectional view of a disk: according to another embodiment of the present invention.

FIG. 8 depicts another disk embodiment according to the present invention. The disk includes some of the same layers as the embodiment of FIGS. 2–3 and a pair of magnetic layers 150a,b and interlayer 154. As shown in FIG. 8, the thickness of the interlayer 154 remains at least substantially constant while the thicknesses of both the magnetic layers 150a and 150b vary radially in at least substantially the same manner (though the variations could be different). Preferably, the compositions of the two magnetic layers are at least substantially the same and the two layers have at least substantially the same thicknesses at the same radial distances from the disk center. The thickness of each of the two magnetic layers preferably ranges from about 30 to about 120 Å. The interlayer is preferably nonmagnetic, with the preferred composition being chromium, and has a preferred thickness ranging from about 2 to about 50 Å. As will be appreciated, the nonmagnetic interlayer serves to decouple the two magnetic layers, leading to lower disk noise. Alternatively, one of the magnetic layers can have a radially variable thickness while the other has a radially constant thickness. Alternatively, the two magnetic layers can have differing compositions.

Figure 9:
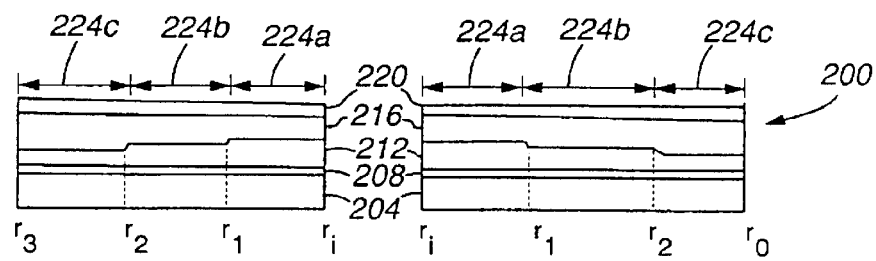
FIG. 9 is a diagrammatic representation of a cross-sectional view of a disk according to another embodiment of the present invention.
Figure 10:
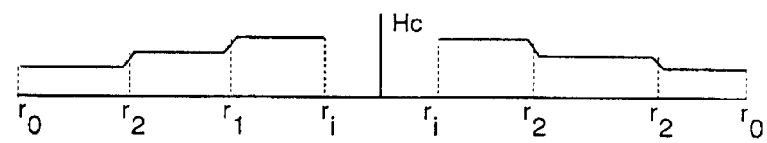
FIG. 10 is a plot of $H_c$ versus radial distance for the disk of FIG. 9.
Figure 11:
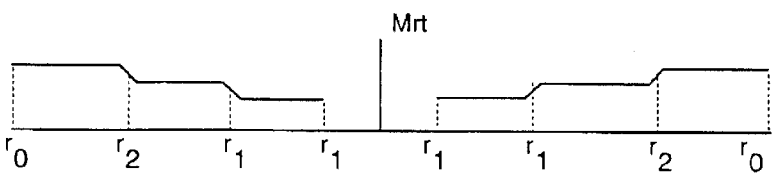
FIG. 11 is a plot of Mrt versus radial distance for the disk of FIG. 9.
Figure 12:
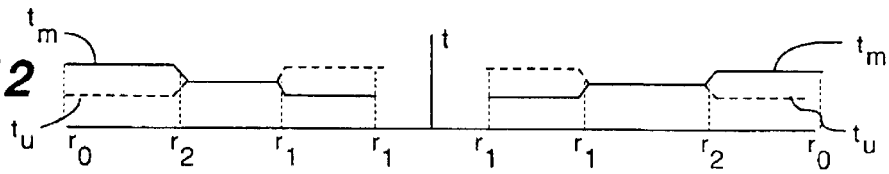
FIG. 12 is a plot of t versus radial distance for the disk of FIG. 9.
Figure 13:
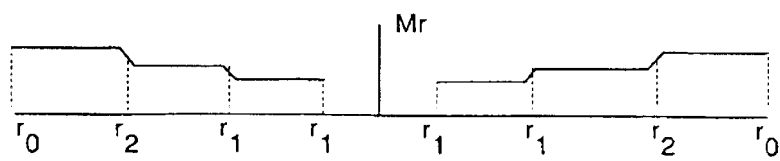
FIG. 13 is a plot of Mr versus radial distance for the disk of FIG. 9.

FIG. 9 depicts a disk according to yet another embodiment of the present invention. The disk 200 includes a substrate 204, for example a nickel-phosphorous layer 208, an underlayer 212, a magnetic layer 216, and a protective layer 220. The thicknesses of the magnetic layer ($t_m$) and underlayer ($t_u$) vary radially in a stepwise (discontinuous fashion). As can be seen from FIGS. 10, 11, 12, and 13, the coercivity, Mrt, magnetic layer and underlayer thicknesses, and Mr, respectively, also change radially in a stepwise fashion. As can be seen from these Figures, the disk has three zones 224a–c (FIG. 9) which are concentrically disposed about the disk center. The thicknesses $t_u$ and $t_m$, Mr, Mrt, and coercivity are each at least substantially constant or uniform in each zone and vary among the zones. The radial width of the first zone 224a is the difference between $r_i$ and $r_1$, of the second zone 224b is the difference between $r_2$ and $r_1$, and of the third zone 224c is the difference between $r_2$ and $r_o$. The disk can have more or fewer than three zones, depending on the application.

In other embodiments, the chemical composition of the magnetic layer can be radially varied in a continuous or stepwise (discontinuous) fashion to vary the magnetic remanence. As will be appreciated, the magnetic remanence is determined not only by magnetic layer thickness but also by chemical composition. In this embodiment, the chemical composition of the magnetic layers are at least substantially constant at a given radial position but different at different radial positions. For example, the magnetization layer can be cobalt-based and have levels or contents of platinum and/or nickel that increase radially from the ID to the OD regions.

Figure 14:
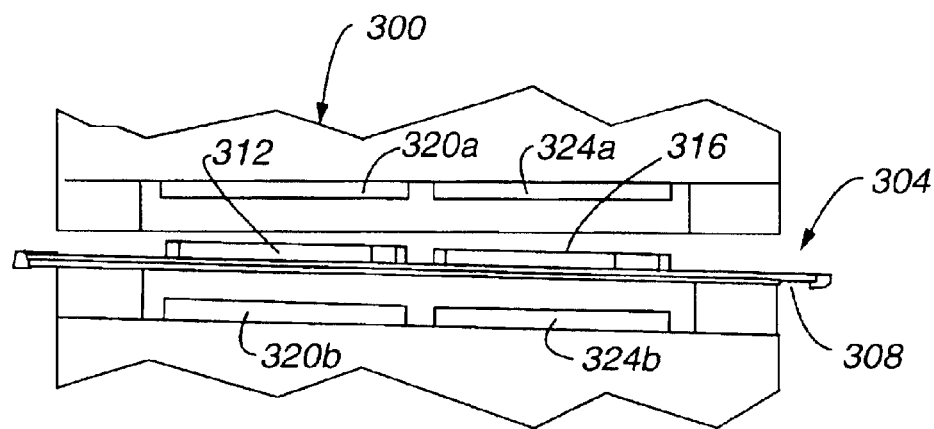
FIG. 14 is a diagrammatic representation of a cross-sectional view of a sputtering station in a sputtering apparatus used in producing the thin-film medium of the present invention.
Figure 15:
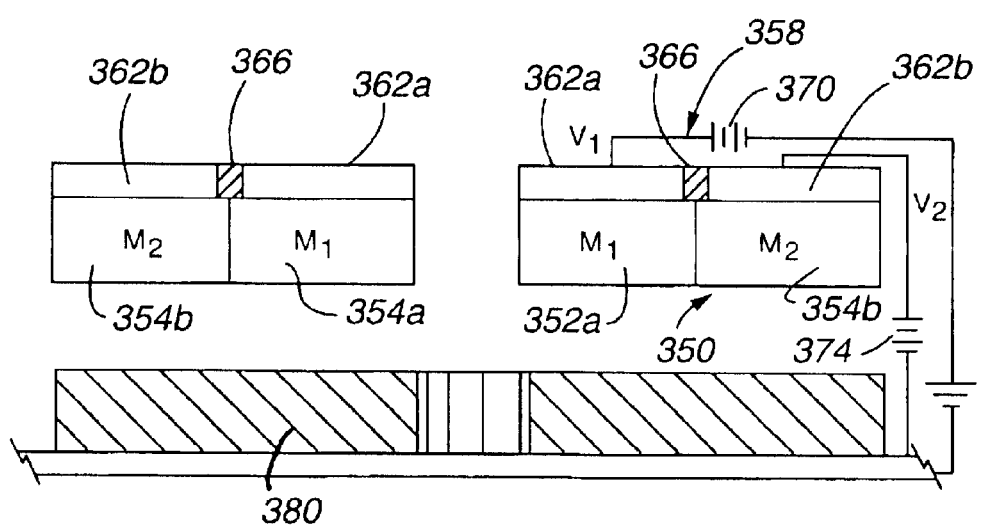
FIG. 15 is a diagrammatic representation of a cross-sectional view of another embodiment of a target configuration in a sputtering station of the type shown in FIG. 14.

FIGS. 14 and 15 each depict a portion of a sputtering system 300 which is used for producing the disk embodiments described above. The system includes a vacuum chamber 304 having at least four stations at which sputtering or heating operations are conducted. A heating station (not shown) at the upstream end of the chamber has a plurality of infrared lights or resistive heaters arrayed for heating both sides of the substrate which is carried through the station in the chamber on a disc holder 308 or pallet. Two substrates 312 and 316 are carried side-by-side on the disc holder 308 for transport through the system on a conveyor.

Downstream of the heating station are a plurality of such sputtering stations, the number of which depends on the number of sputtered layers to be deposited. In the disk embodiment of FIG. 3, four stations would be used to sputter (i) the underlayer 112, (ii) the magnetic layer 116, (iii) the barrier layer 120, and (iv) the protective layer 124. The nickel-phosphorous and lubricant layers are typically deposited by other techniques, such as plating techniques for the nickel-phosphorous layer and dipping or chemical vaporization techniques for the lubricant layer.

FIG. 14 is an illustrative station used for sputtering layers of constant thickness (i.e., the barrier layer 120 and protective layer 124 in the disk embodiment of FIG. 3). For each substrate 312 and 316, the station includes two circular or rectangular targets 320a,b and 324a,b, respectively, each of which can sputter a selected metal or metal alloy onto the substrate. Sputtering is described in detail in U.S. Pat. Nos. 5,723,032; 5,707,706; 5,520,981; 5,432,012; 5,324,593; 5,149,409; 4,929,514; and 4,610,911, each of which is incorporated herein by reference.

FIG. 15 depicts a modified sputtering configuration for use in producing the underlayer 112 and magnetic layer 116, which have radially varying thicknesses. The sputtering configuration employs a coaxial, two-alloy target 350 composed on an inner, annular target portion 354a and an outer annular target portion 354b positioned above substrate 380.

As will be appreciated, a dual substrate system, as in FIG. 14, would include a pair of such dual targets positioned side-by-side. The inner and outer annular target portions 354a,b can be of the same composition (for a layer of varying thickness but of uniform chemical composition) or of differing compositions (for a layer of constant or varying thickness but of nonuniform chemical composition).

The target 350 is mounted on plate 358 which itself is composed of two annular plate portions 362a,b which support the corresponding inner and outer portions of target 354a,b, respectively, and which are separated by an insulating ring 366. The two plate portions are can be connected to separate DC power supplies, indicated at 370 and 374 for applying voltages V1 and V2 between the respective target portions and the substrate.

The applied power and/or voltages are adjusted to produce the desired flux of sputtered material from the inner target portion onto the substrate. For producing a uniform-thickness layer, the voltages are adjusted to apply substantially the same power to each target portion.

For producing underlayer 112 in which the layer has a thickness gradient in the radial direction as shown in FIG. 3, the voltage applied to the inner target portion, which is intended to produce a higher target flux is typically about 300 to 700 volts higher than that applied to the outer target portion.

For producing magnetic layer 116 in which the layer has a thickness gradient in the radial direction as shown in FIG. 3, the voltage applied to the outer target portion, which is intended to produce a higher target flux is typically about 300 to 700 volts higher than that applied to the inner target portion.

In operation, the sputtering chamber is evacuated to a pressure of about $10^{-7}$ Torr, and argon gas is introduced into the chamber to a final sputtering pressure of 5 to 40 mTorr. The substrate(s) is heated in the heating station to a selected temperature (e.g., typically from about 50 to about 400° C.) before advancing into the four sputtering chambers of the appropriate configuration. The heating conditions in the system are preferably adjusted to achieve a substrate temperature of between about 200° C., and preferably about 300° C. Ceramic and glass substrates can be heated up to about 380° C.

The deposition conditions for the underlayer 112 typically are a sputter pressure ranging from about 3 to about 100 mTorr; for the magnetic layer 116 a sputter pressure ranging from about 3 to about 100 mTorr; for the barrier layer 120 a sputter pressure ranging from about 3 to about 100 mTorr; and for the protective layer 124 a sputter pressure ranging from about 3 to about 50 mTorr.

The substrate(s) are moved consecutively from station to station until the desired layers are deposited in the desired thicknesses.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A disk for information storage, comprising:
   (a) a substrate;
   (b) an information layer for containing information; and
   (c) an underlayer located between the substrate and the information layer, wherein at least one of the following conditions is true:
   (i) the disk has at least two recording parameters that vary inversely radially outwardly and the underlayer has a thickness that decreases from an inner radial location of the disk to an outer radial location of the disk; and
   (ii) the information layer has a thickness that increases progressively from an inner disk diameter to an outer disk diameter and the thickness of the information layer at the outermost peripheral information storage location is greater than the thickness of the information layer at the innermost information storage location.

2. The disk of claim 1, wherein condition (i) is true.

3. The disk of claim 2, wherein the information layer has a first thickness at a first radial position and a second thickness at a second radial position, the first and second radial positions being measured from a disk center, wherein the first thickness is less than the second thickness and wherein the first radial position is closer to the disk center than the second radial position.

4. The disk of claim 2, wherein the at least two recording parameters of condition (i) include a coercivity and at least one of a magnetic moment (Mrt) and magnetic remanence and wherein the at least two recording parameters are substantially constant along the length of a selected radial track.

5. The disk of claim 4, wherein the magnetic remanence and magnetic moment of the disk vary radially outwardly.

6. The disk of claim 4, wherein the at least one of the magnetic remanence and the magnetic moment ("Mrt") of the disk increases from the inner disk diameter to the outer disk diameter, and the coercivity decreases from the inner disk diameter to the outer disk diameter.

7. The disk of claim 4, wherein a first radial zone has first recording properties that are at least substantially constant throughout the first radial zone and a second radial zone has second recording properties that are at least substantially constant throughout the second radial zone, wherein the first radial zone is located nearer a center of the disk than the second radial zone, and wherein the first and second recording properties are different from one another.

8. The disk of claim 4, wherein the magnetic remanence is one of the recording parameters, the magnetic remanence ranges from about 100 to about 600 emu/cm$^3$, and a first magnetic remanence at a first inner radial location is no more than about 95% of a second magnetic remanence at a second outer radial location.

9. The disk of claim 4, wherein the magnetic moment is one of the recording parameters, the magnetic remanence ranges from about 100 to about 600 emu/cm$^3$, and a first magnetic moment at a first inner radial location is no more than about 95% of a second magnetic moment at a second outer radial location.

10. The disk of claim 2, wherein the chemical composition of the information layer varies radially.

11. The disk of claim 10, wherein the chemical composition of the information layer comprises from about 60 to about 80 atomic percent cobalt, from about 0.5 to about 5 atomic percent chromium, from about 0.5 to about 5 atomic percent tantalum, from about 1 to about 10 atomic percent platinum, and from about 0.5 to about 5 atomic percent boron.

12. The disk of claim 2, wherein the at least two recording parameters comprise coercivity.

13. The disk of claim 12, wherein the coercivity ranges from about 2,000 to about 6,000 Oersteds and the information layer has a squareness ranging from about 0.6 to about 1.0.

14. The disk of claim 2, wherein the variation in the thickness of the underlayer causes at least one of the at least two recording parameters to vary radially.

15. The disk of claim 14, wherein a coercivity of the information layer decreases from an inner radial location of the disk to an outer radial location of the disk.

16. The disk of claim 1, wherein condition (ii) is true.

17. The disk of claim 16, wherein the thickness of the information layer ranges from about 60 to about 300 angstroms and the information layer has a first thickness at a first inner radial location and a second thickness at a second outer radial location and the first thickness is at least about 75% of the second thickness.

18. The disk of claim 1, wherein the information layer includes a first magnetic layer, a second magnetic layer, and an at least substantially non-magnetic layer located between the first and second magnetic layers and a thickness of at least one of the first and second magnetic layers increases from the inner diameter to the outer diameter.

19. The disk of claim 18, wherein the substrate includes one of the following: an aluminum plate, a ceramic plate, and a glass-based plate.

20. The disk of claim 18, further comprising:
    a protective layer, the information layer being located between the protective layer and the underlayer.

21. The disk of claim 20, further comprising:
    a barrier layer that is located between the information layer and the protective layer.

22. The disk of claim 21, further comprising:
    a lubricant layer that is located adjacent to the protective layer and separated from the information layer by the protective layer.

23. The disk of claim 1, further comprising:
    a nickel-phosphorus layer that is located between the substrate and the underlayer.

24. The disk of claim 1, wherein conditions (i) and (ii) are true.

25. The disk of claim 24, wherein a bit length in an outer diameter region is greater than a bit length in an inner diameter region.

26. The disk of claim 1, wherein, in the at least one of the following conditions, the variation in at least two recording parameters of condition (i) and the increase in information layer thickness of condition (ii), as appropriate, is at least substantially linear.

27. The disk of claim 1, wherein, in the at least one of the following conditions, the variation in at least two recording parameters of condition (i) and the increase in information layer thickness of condition (ii), as appropriate, is at least substantially rectilinear.

28. The disk of claim 1, wherein, in the at least one of the following conditions, the variation in at least two recording parameters of condition (i) and the increase in information layer thickness of condition (ii), as appropriate, is at least substantially curvilinear.

29. The disk of claim 1, wherein, in the at least one of the following conditions, the variation in at least two recording parameters of condition (i) and the increase in information layer thickness of condition (ii), as appropriate, is discontinuous along the radius of the disk.

30. The disk of claim 1, wherein the information layer has a first areal density at a first inner radial location and a second areal density at a second outer radial location and the first areal density is at least about 105% of the second areal density.

31. The disk of claim 30, wherein the first areal density ranges from about 105 to about 140% of the second areal density.

32. The disk of claim 1, wherein the information layer is configured to operatively exchange information with a magnetoresistive head.

33. A disk for information storage, comprising:
   (a) a substrate;
   (b) an information layer operable to contain information, wherein (i) the information layer has a first coercivity at a first innermost radial location that is more than a second coercivity of the information layer at a second outermost radial location and (ii) the information layer has a first magnetic moment at the first inner radial location that is less than a second magnetic moment of the information layer at the second outer radial location; and
   (c) a protective layer located above the information layer.

34. The disk of claim 33, wherein a bit length in the second outer radial location is greater than a bit length in the first inner radial location.

35. The disk of claim 34, wherein a first areal density at the first inner radial location is at least about 105% of a second areal density at the second outer radial location.

36. The disk of claim 33, wherein a first magnetic remanence at the first inner radial location is no more than about 95% of a second magnetic remanence at the second outer radial location.

37. The disk of claim 36, wherein the first and second magnetic remanence each range from about 100 to about 600 emu/cm$^3$.

38. The disk of claim 33, wherein the chemical composition of the information layer at the first inner radial location layer is different than the chemical composition of the information layer at the second outer radial location.

39. The disk of claim 38, wherein the chemical composition is from about 60 to about 80 atomic percent cobalt, from about 0.5 to about 5 atomic percent chromium, from about 0.5 to about 5 atomic percent tantalum, from about 1 to about 10 atomic percent platinum, and from about 0.5 to about 5 atomic percent boron.

40. The disk of claim 33, wherein a first thickness of the information layer at the first inner radial location is less than a second thickness of the information layer at the second outer radial location.

41. The disk of claim 40, wherein the first and second thicknesses each range from about 60 to about 300 angstroms.

42. The disk of claim 40, further comprising an underlayer located between the substrate and the information layer, the underlayer having a third thickness at the first radial location and a fourth thickness at the second radial location, wherein the third thickness is greater than the fourth thickness.

43. The disk of claim 33, wherein the first magnetic moment is no more than about 95% of the second magnetic moment.

44. The disk of claim 43, wherein the first and second magnetic moments each range from about 0.2 to about 1.0 memu/cm$^2$.

45. The disk of claim 33, wherein the information layer has a first magnetic remanence at the first inner radial location that is less than a second magnetic remanence of the information layer at the second outer radial location.

46. The disk of claim 45, wherein a squareness of the disk at each of the first inner and second outer radial locations ranges from about 0.6 to about 1.0.

47. The disk of claim 33, wherein the first and second coercivities each range from about 2,000 to about 6,000 Oersteds.

48. The disk of claim 33, wherein the disk further comprises an underlayer between the substrate and the information layer and wherein the underlayer has a first underlayer thickness at the first inner radial location that is greater than a second underlayer thickness of the underlayer at the second outer radial location.

49. The disk of claim 48, wherein each of the first and second underlayer thicknesses range from about 50 to about 5,000 angstroms.

50. The disk of claim 33, wherein a radial gradient in at least one of (a) the coercivity in condition (i) and (b) the magnetic moment in condition (ii) is at least substantially linear.

51. The disk of claim 33, wherein a radial gradient in at least one of (a) the coercivity in condition (i) and (b) the magnetic moment in condition (ii) is at least substantially rectilinear.

52. The disk of claim 33, wherein a radial gradient in at least one of (a) the coercivity in condition (i) and (b) the magnetic moment in condition (ii) is at least substantially curvilinear.

53. The disk of claim 33 wherein a radial gradient in at least one of (a) the coercivity in condition (i) and (b) the magnetic moment in condition (ii) is discontinuous along the radius of the disk.

54. The disk of claim 33, wherein the information layer is configured to operatively exchange information with a magnetoresistive head.

55. A disk for information storage, comprising:
   (a) a substrate; and
   (b) an information layer configured to contain information, wherein a first recording parameter of the information layer at a first innermost radial location is higher than the first recording parameter at a second, outermost radial location and a second recording parameter of the information layer at the first radial location is lower than the second recording parameter at the second radial location, wherein the first and second first recording parameters are different from one another, and wherein the first recording parameter is coercivity and the second recording parameter is magnetic moment.

56. The disk of claim 55, wherein a third recording parameter of the information layer at the first radial location is lower than the third recording parameter at the second radial location and wherein the third recording parameter is magnetic remanece.

57. The disk of claim 56, wherein the first magnetic remanence at the first radial location is no more than about 95% of the second magnetic remanence at the second radial location.

58. The disk of claim 57, wherein the first and second magnetic remanence each range from about 100 to about 600 emu/cm$^3$.

59. The disk of claim 56, wherein a radial gradient in at least one of (a) the magnetic remanence, (b) the magnetic moment, and (c) the coercivity is at least substantially rectilinear.

60. The disk of claim 56, wherein a radial gradient in at least one of (a) the magnetic remanence, (b) the magnetic moment, and (c) the coercivity is at least substantially curvilinear.

61. The disk of claim 56, wherein a radial gradient in at least one of (a) the magnetic remanence, (b) the magnetic moment, and (c) the coercivity is discontinuous along the radius of the disk.

62. The disk of claim 55, wherein the chemical composition of the information layer at the first radial location layer is different than the chemical composition of the information layer at the second radial location.

63. The disk of claim 62, wherein the chemical composition is from about 60 to about 80 atomic percent cobalt, from about 0.5 to about 5 atomic percent chromium, from about 0.5 to about 5 atomic percent tantalum, from about 1 to about 10 atomic percent platinum, and from about 0.5 to about 5 atomic percent boron.

64. The disk of claim 55, wherein the first and second coercivities each range from about 2,000 to about 6,000 Oersteds.

65. The disk of claim 55, wherein a squareness of the disk at each of the first inner and second outer radial locations ranges from about 0.6 to about 1.0.

66. The disk of claim 55, wherein the disk further comprises an underlayer between the substrate and the information layer and wherein the underlayer has a first underlayer thickness at the first radial location that is greater than a second underlayer thickness of the underlayer at the second radial location and wherein the first radial location is located nearer a center of the disk than the second radial location.

67. The disk of claim 66, wherein each of the first and second underlayer thicknesses range from about 50 to about 5,000 angstroms.

68. The disk of claim 66, wherein a first thickness of the information layer at the first radial location is less than a second thickness of the information layer at the second radial location.

69. The disk of claim 55, wherein a first thickness of the information layer at the first radial location is less than a second thickness of the information layer at the second radial location and wherein the first radial location is nearer a center of the disk than the second radial location.

70. The disk of claim 69, wherein the first and second information layer thicknesses each range from about 60 to about 300 angstroms.

71. The disk of claim 69, wherein the first magnetic moment is no more than about 95% of the second magnetic moment.

72. The disk of claim 71, wherein the first and second magnetic moments each range from about 0.2 to about 1.0 memu/cm$^2$.

73. The disk of claim 55, wherein the information layer is configured to operatively exchange information with a magnetoresistive head.

74. A disk for information storage, comprising:

(a) a substrate;

(b) an information layer for containing information;

(c) an underlayer located between the substrate and the information layer, the underlayer having a third thickness at a first radial position and a fourth thickness at a second radial position, wherein the third thickness is greater than the fourth thickness and wherein at least one of the following conditions is true:

(i) the disk has at least two recording parameters that vary inversely radially outwardly and (ii) the information layer has a thickness that increases progressively from an inner disk diameter to an outer disk diameter, wherein the information layer has a first thickness at a first radial position and a second thickness at a second radial position, the first and second radial positions being measured from a disk center, wherein the first thickness is less than the second thickness and wherein the first radial position is closer to the disk center than the second radial position.

75. A disk for information storage, comprising:

(a) a substrate;

(b) an information layer operable to contain information, wherein the information layer has a first magnetic moment at a first inner radial location that is less than a second magnetic moment of the information layer at a second outer radial location and wherein a first thickness of the information layer at the first inner radial location is less than a second thickness of the information layer at the second outer radial location; and (c) an underlayer located between the substrate and the information layer, the underlayer having a third thickness at a first radial location and a fourth thickness at a second radial location, wherein the third thickness is greater than the fourth thickness.

76. The disk of claim 75, wherein the information layer has a first coercivity at the first inner radial location that is more than a second coercivity of the information layer at the second outer radial location.

* * * * *

UNITED STATES PATENT AND TRADEMARK OFFICE
CERTIFICATE OF CORRECTION

PATENT NO. : 6,808,783 B1
DATED : October 26, 2004
INVENTOR(S) : Lin et al.

It is certified that error appears in the above-identified patent and that said Letters Patent is hereby corrected as shown below:

Column 11,
Line 20, after the word "location" add -- and the underlayer has a thickness that decreases from an inner radial location of the disk to an outer radial location of the disk --.

Signed and Sealed this

Fifth Day of April, 2005

JON W. DUDAS
*Director of the United States Patent and Trademark Office*